United States Patent [19]

Suga et al.

[11] Patent Number: 5,005,547
[45] Date of Patent: Apr. 9, 1991

[54] ABNORMAL COMBUSTION-DETECTING DEVICE AND COMBUSTION CONTROL DEVICE FOR INTERNAL COMBUSTION ENGINES

[75] Inventors: Toshiyuki Suga; Hideaki Arai; Shinichi Kitajima, all of Wako, Japan

[73] Assignee: Honda Giken Kogyo Kabushiki Kaisha, Tokyo, Japan

[21] Appl. No.: 373,946

[22] Filed: Jun. 29, 1989

[30] Foreign Application Priority Data

Jul. 1, 1988 [JP] Japan ............................... 63-165585
Mar. 7, 1989 [JP] Japan ................................... 1-54800

[51] Int. Cl.⁵ .............................................. F02P 5/10
[52] U.S. Cl. .................................................. 123/425
[58] Field of Search ................ 123/417, 421, 425, 435, 123/479, 640

[56] References Cited

U.S. PATENT DOCUMENTS

| 4,458,646 | 7/1984 | Suzuki et al. | 123/425 |
| 4,487,184 | 12/1984 | Böning et al. | 123/425 |
| 4,727,841 | 3/1988 | Hirose et al. | 123/425 |
| 4,790,279 | 12/1988 | Tobinaga et al. | 123/425 X |
| 4,802,455 | 2/1989 | Abo | 123/425 |
| 4,846,128 | 7/1989 | Yagi et al. | 123/425 |

FOREIGN PATENT DOCUMENTS 0075629  6/1980  Japan .
0213948  12/1984  Japan ................................... 123/421

*Primary Examiner*—Willis R. Wolfe
*Attorney, Agent, or Firm*—Lyon & Lyon

[57] ABSTRACT

An abnormal combustion-detecting device and a combustion control device for internal combustion engines. Ignition timing for the cylinders is set in accordance with engine operating conditions. The set ignition timing for at least one of the cylinders is retarded when the engine is in a predetermined operating condition. Abnormal combustion caused by postignition within the at least one cylinder is detected when the set ignition timing is retarded. When abnormal combustion is detected within the at least one cylinder, temperature within the cylinders is lowered, thereby positively preventing possible occurrence of preignition.

20 Claims, 5 Drawing Sheets

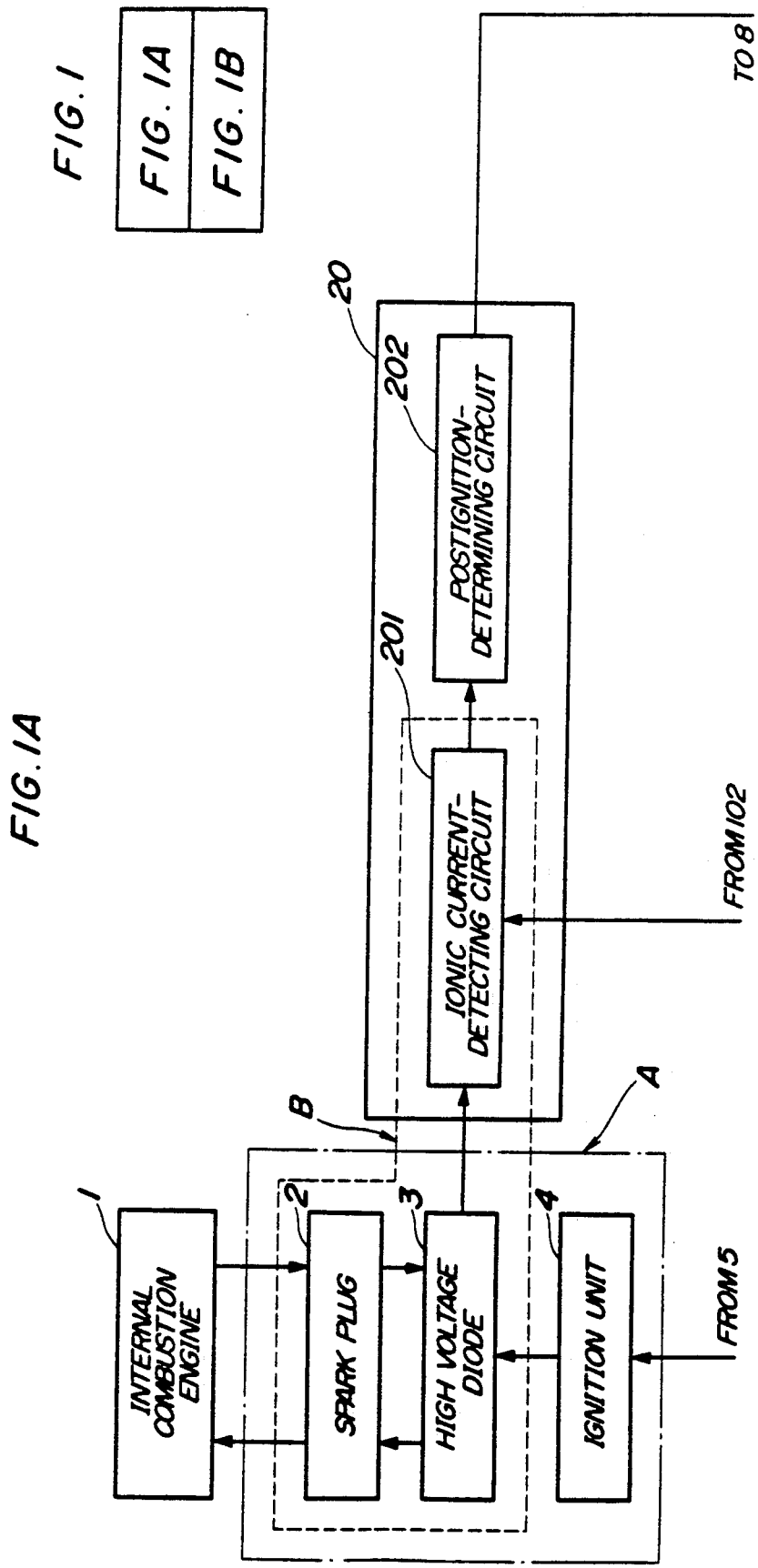

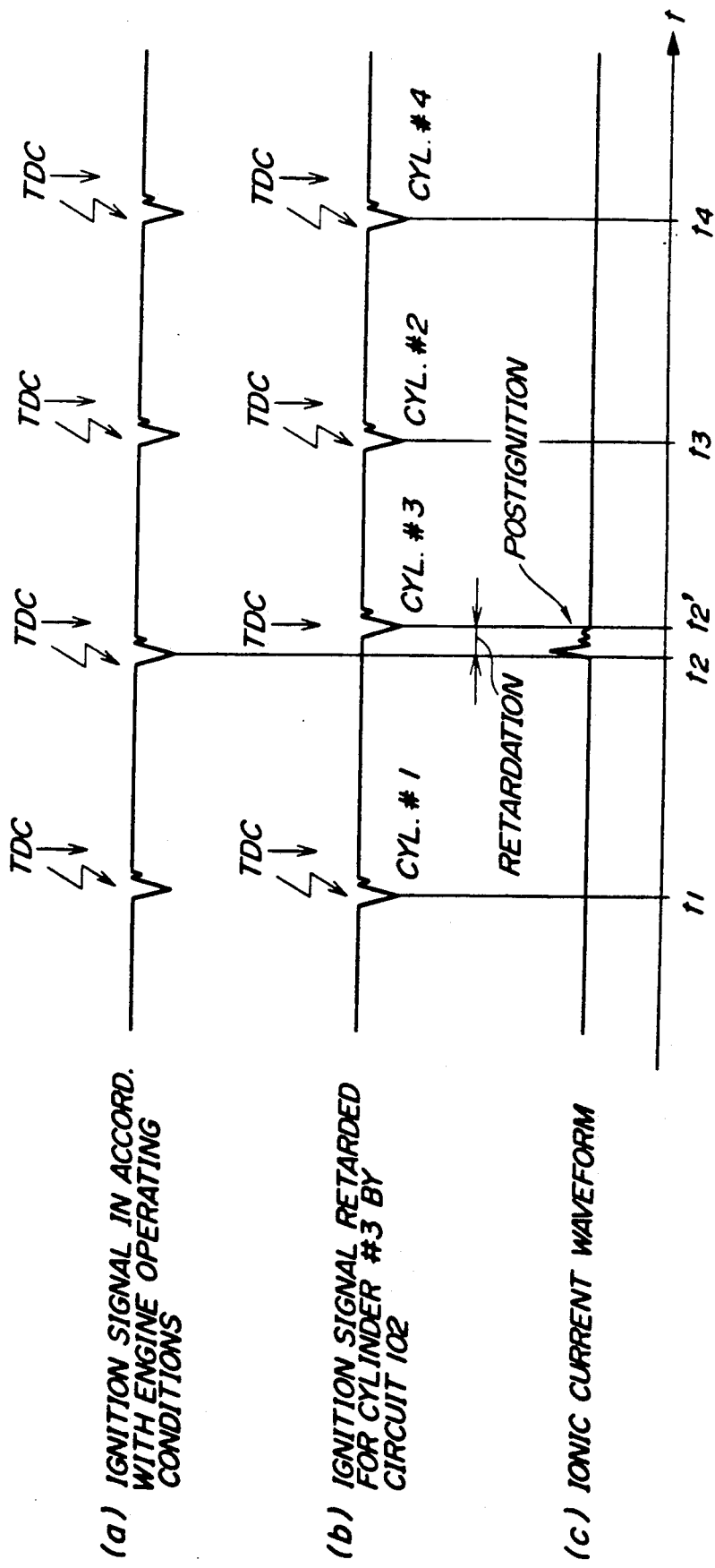

ABNORMAL COMBUSTION-DETECTING DEVICE AND COMBUSTION CONTROL DEVICE FOR INTERNAL COMBUSTION ENGINES

BACKGROUND OF THE INVENTION

This invention relates to an abnormal combustion-detecting device and a combustion control device for internal combustion engines, and more particularly to an abnormal combustion-detecting device which is adapted to detect abnormal combustion caused by so-called hot surface ignition, and a combustion control device which is adapted to supress abnormal combustion detected by the former device.

In an internal combustion engine equipped with an ignition timing control system, the ignition timing, at which is ignited an air-fuel mixture supplied into an engine cylinder, is set to a value suited for operating conditions in which the engine is operating, so as to optimize the driveability of the engine as well as emission characteristics thereof. However, it is known that, during actual operation of the engine, there can occur so-called preignition, which is a kind of abnormal combustion that the mixture starts to burn in advance of the set ignition timing. The preignition possibly leads to poor driveability of the engine or even serious damage to same. Furthermore, in recent years, there is a tendency toward increased possibility of occurrence of preignition with recent improvement in engine performance and increase in engine output torque, as well as recent wider use of methanol fuels in engines.

Abnormal combustion is primarily attributable to so-called hot surface ignition that a mixture compressed within the engine cylinder becomes ignited by heat of the hot surface of the overheated spark plug or cylinder inner wall in advance of the usual spark ignition by the spark plug. Particularly, use of a methanol fuel (alcohol mixture fuel), which has recently been developed for the purposes of environmental protection as well as energy saving, in an internal combustion engine further increases the possibility of hot surface ignition or abnormal combustion.

In an attempt to avoid such abnormal combustion, an abnormal combustion-detecting device has been proposed, e.g., by Japanese Provisional Patent Publication (Kokai) No. 55-75629, which is adapted to detect ionic current caused by burning of a mixture within the engine cylinder to determine a combustion state therewithin.

Hot surface ignition is classified into preignition, i.e., ignition which takes place at a timing before normal spark ignition timing, and postignition, i.e., ignition which takes place at a timing behind normal spark ignition timing when spark ignition is not effected at normal timing. It is known that the timing of occurrence of flame caused by postignition progressively advances, as the temperature of the cylinder inner wall etc. rises, and eventually into preignition. Based on this fact, it is possible to predict the possibility of occurrence of preignition by detecting postignition occurring during operation of the engine. However, in actuality, the occurrence of postignition cannot be recognized by detecting merely a timing at which the mixture starts to burn within the engine cylinder, because flame due to the postignition appears only after the mixure has partly started to burn due to the spark ignition by the spark plug.

On the other hand, the preignition is a phenomenon that a mixture starts to burn within the engine cylinder in advance of spark ignition by the spark plug. That is, when preignition occurs, flame caused thereby is propagated throughout the interior of the engine cylinder to cause explosion therein when the engine is still on the compression stroke, thereby possibly doing serious damage to engine parts in the worst case. Unlike postignition, the occurrence of preignition can actually be recognized by detecting the timing at which the mixture starts to burn, because the flame caused by preignition appears before the mixure starts to burn upon spark ignition by the spark plug. However, it is requisite to prevent occurrence of preignition, because once preignition occurs, the engine may be seriously damaged.

SUMMARY OF THE INVENTION

It is an object of the invention to provide an abnormal-combustion detecting device which is capable of detecting occurrence of postignition and therefore predicting the possibility of occurrence of preignition.

It is a further object of the invention to provide a combustion control device, which is capable of carrying out proper operation for preventing occurrence of preignition when it is predicted that preignition may occur.

According to the present invention, there is provided an abnormal combustion-detecting device for an internal combustion engine having cylinders, which detects abnormal combustion of an air-fuel mixture supplied to the cylinders, characterised by comprising:

ignition timing-setting means for setting ignition timing for the cylinders in accordance with operating conditions in which the engine is operating;

ignition timing-retarding means for retarding the set ignition timing for at least one of the cylinders when the engine is in a predetermined operating condition; and abnormal combustion-detecting means for detecting abnormal combustion within the at least one cylinder when the ignition timing-retarding means retards the set ignition timing.

Preferably, the ignition timing-retarding means retards the set ignition timing to a timing later than timing of possible occurrence of postignition.

According to the present invention, there is also provided a combustion control device for an internal combustion engine having cylinders, which controls combustion of an air-fuel mixture supplied to the cylinders, characterized by comprising:

ignition timing-setting means for setting ignition timing for the cylinders in accordance with operating conditions in which the engine is operating;

ignition timing-retarding means for retarding the set ignition timing for at least one of the cylinders when the engine is in a predetermined operating condition;

abnormal combustion-detecting means for detecting abnormal combustion within the at least one cylinder when the ignition timing-retarding means retards the set ignition timing; and cylinder temperature-lowering means for lowering temperature within the cylinders when the abnormal combustion-detecting means detects abnormal combustion within the at least one cylinder.

Preferably, the predetermined operating condition may be a condition that a temperature of the engine is higher than a predetermined high temperature value.

More preferably, the temperature of the engine may be the temperature of intake air being supplied to the engine.

The temperature of the engine may be the temperature of engine coolant.

The predetermined operating condition may be a condition that a temperature of the engine is within a predetermined range within which the engine can produce high output.

The temperature of the engine may be the temperature of intake air being supplied to the engine.

The predetermined operating condition may be a condition that engine knocking of a magnitude within a predetermined range occurs in the engine.

The ignition timing-retarding means may retard the ignition timing solely for a particular one of the cylinders.

The cylinder temperature-lowering means may retard simultaneously the ignition timing for all the cylinders.

The cylinder temperature-lowering means may retard the ignition timing for the cylinders by a predetermined time period.

The cylinder temperature-lowering means may retard the ignition timing for the cylinders by a predetermined angle.

The cylinder temperature-lowering means may carry out the retardation of the ignition timing over a predetermined time period, and thereafter progressively advance the ignition timing from the retarded ignition timing to the set ignition timing.

The abnormal combustion-detecting means may comprise means for detecting ionic current created by combustion within the at least one cylinder, and detecting abnormal combustion based upon the detected ionic current.

The abnormal combustion-detecting means may judge that abnormal combustion occurs within the at least one cylinder when the ionic current has occurred a predetermined number of times or more during the predetermined operating condition of the engine.

The abnormal combustion-detecting means may comprise means for optically sensing flame caused by combustion within the at least one cylinder, and detecting abnormal combustion within the at least one cylinder based upon the sensed flame.

The abnormal combustion-detecting means may comprise means for detecting a change rate in the rotational speed of the engine, and detecting abnormal combustion within the at least one cylinder based upon the detected change rate in the rotational speed of the engine.

The abnormal combustion-detecting means may comprise means for detecting a change rate in torque from the engine, and detecting abnormal combustion within the at least one cylinder based upon the detected change rate in the torque.

The abnormal combustion-detecting means may comprise means for detecting a change rate in pressure within the at least one cylinder, and detecting abnormal combustion within the at least one cylinder based upon the detected change rate in the pressure.

The above and other objects, features and advantages of the invention will be more apparent from the ensuing detailed description taken in conjunction with the accompanying drawings.

BRIEF DESCRIPTION OF THE DRAWINGS

FIG. 2 is a timing chart showing the relationship in timing of generation between (a) an ignition signal determined in accordance with operating conditions of the engine, (b) an ignition signal retarded by a particular ignition timing-retarding circuit, and (c) an ionic current waveform representative of occurrence of postignition;

DETAILED DESCRIPTION

The invention will now be described in detail with reference to the drawings showing embodiments thereof.

Figure 1B:
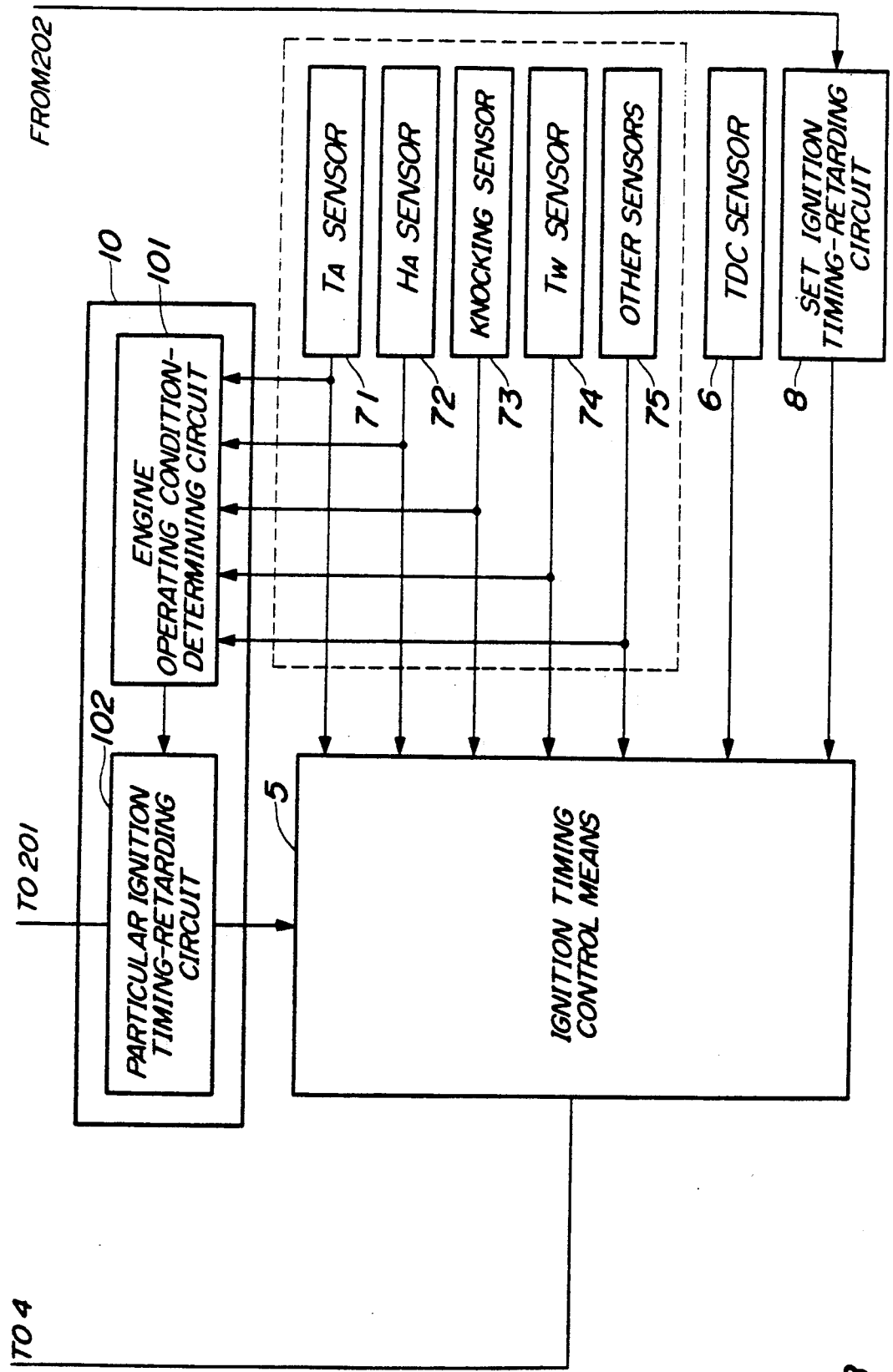
FIG. 1 is a block diagram of the whole arrangement of an ignition timing control system for an internal combustion engine, to which are applied an abnormal combustion-detecting device and a combustion control device according to a first embodiment of the invention.

Referring first to FIG. 1, there is illustrated the overall arrangement of an ignition timing control system for an internal combustion engine, to which are applied an abnormal combustion-detecting device as well as combustion control device according to the invention.

The ignition timing control system is adapted to control the timing of ignition of an air-fuel mixture supplied to the engine 1, which may be a four-cylinder type, for example. The ignition timing control system comprises an ignition timing control means 5, which supplies an ignition timing signal to a spark plug 2 of each engine cylinder via an ignition unit 4 for causing same 2 to produce a spark for ignition of the mixture within each engine cylinder.

Electrically connected to the ignition timing control means 5 is a top-dead-center position (TDC) sensor 6, which is arranged in facing relation, e.g., to a camshaft, not shown, of the engine 1. The TDC sensor 6 is adapted to generate a pulse of a TDC signal at a predetermined crank angle, e.g., 10 degrees before the top dead center, of the engine 1 at the end of the compression stroke, whenever the engine crankshaft rotates through 180 degrees. Pulses generated by the TDC sensor 6 are supplied to the ignition timing control mean 5.

Further connected to the ignition timing control means 5 are an intake air temperature ($T_A$) sensor 71, an intake air humidity ($H_A$) sensor 72, an engine knocking sensor 73, an engine coolant temperature ($T_W$) sensor 74, and other sensors 75 for detecting other engine operating parameters, for supplying the means 5 with respective output signals indicative of the sensed engine operating parameters. The ignition timing control means 5 determines ignition timing based upon these output signals from the sensors 6 and 71–75, which can optimize the driveability and emission characteristics of the engine.

The sensors 71–74 are also electrically connected to an engine operating condition-determining circuit 101, hereinafter referred to, for determining operating conditions of the engine, under which postignition or preignition are likely to take place, based upon output signals supplied from the sensors.

Further, a particular ignition timing-retarding circuit 102, and a set ignition timing-retarding circuit 8 are electrically connected to the ignition timing control means 5. The particular ignition timing-retarding circuit 102 cooperates with the engine operating condition-determining circuit 101 to form ignition timing-retarding means 10, hereinafter referred to. The set ignition timing-retarding circuit 8 operates in cooperation with the ignition timing control means 5 to retard ignition timing within all the engine cylinders to thereby lower temperature therein for preventing occurrence of preignition, when it is detected by abnormal combustion-detecting means 20 that abnormal combustion has occurred within one of the engine cylinders. The ignition timing control means 5 retards the ignition timing signal determined in accordance with engine operating conditions, by a predetermined time period or angle (crank angle), in response to a signal from the cirucit 102 or 8.

The ignition timing control means 5 supplies the ignition timing signal representative of ignition timing to the ignition unit 4 which is composed of a distributor, an ignition coil, and an igniter, none of which is shown. The distributor electrically connects the spark plug 2 of each engine cylinder, in which the compression stroke has just been completed, to the ignition coil, and then the igniter energizes and discharges the ignition coil in response to the ignition timing signal. An ignition signal, shown at (a) of FIG. 2, which is created by the discharging of the ignition coil, is supplied to the spark plug of each engine cylinder for spark ignition therein.

A high voltage diode 3 is connected between the spark plug 2 and the ignition unit 4 so that the spark plug 2 and the high voltage diode 3 cooperate with the ignition unit 4 to form an ignition voltage circuit A for effecting spark ignition, and at the same time they cooperate with an ionic current-detecting circuit 201 to form a combustion state-detecting circuit B for detecting combustion states within the engine cylinders. Specifically, the spark plug 2 serves not only as an ignition section of the ignition voltage circuit A, but also as an ionic current-detecting section of the combustion state-detecting circuit B, as disclosed by Japanese Provisional Patent Publication (Kokai) No. 55-75629.

The combustion state-detecting circuit B detects a combustion state within each engine cylinder from ionic current flowing between electrodes of the spark plug 2 which is created by burning of the mixture within the engine cylinder. To this end, a predetermined voltage is applied between the electrodes by a battery, not shown, incorporated in the combustion state-detecting circuit B, so that when the mixture within the cylinder is burnt, ionic current is created to flow in the ionic current-detecting circuit B. By detecting the ionic current it can be determined whether or not combustion has taken place within the engine cylinder.

The high voltage diode 3 prohibits high voltage current from flowing from the ignition unit 4 to the ionic current-detecting circuit 201, while allowing the current to flow only to the spark plug 2, so that the spark plug 2 can perform two functions, i.e., as the ignition section of the ignition voltage circiut A when high voltage current is applied thereto from the ignition unit 4 through the high-voltage diode 3, and as the ionic current-detecting section of the combustion-detecting circuit B when no high voltage current is applied thereto.

The ionic current, which is created by the spark plug 2, indicative of occurrence of combustion within the engine cylinder is supplied to the abnormal combustion-detecting means 20 formed by the ionic current-detecting circuit 201 and a postignition-determining circuit 202, through the high voltage diode 3.

The operation of the ignition timing-retarding means 10 and the abnormal combustion-detecting means 20 of the ignition timing control system, arranged as above, will be described hereinbelow with reference to FIG. 2.

As stated before, the hot surface ignition, which is a kind of abnormal combustion, is classified into postignition occurring behind normal spark ignition by the spark plug 2, and preignition occurring before the normal spark ignition. As generally known, preignition is preceded by postignition without exception, that is, the timing of postignition progressively advances into preignition. The present invention is based upon the above fact. According to the invention, the ignition timing is retarded by the ignition timing-retarding means 10 by a predetermined time period or angle for a particular engine cylinder #3 in the example of FIG. 2, i.e., to a timing later than the timing of postignition, when a predetermined engine operating condition under which preignition can occur is satisfied, e.g., high intake air temperature $T_A$, particular intake air temperature ($T_A$) range, high engine coolant temperature $T_W$, to thereby enable detection of occurrence of postignition by the abnormal combustion-detecting means 20. The predetermined time period or angle by which the ignition timing is retarded is set at such a small value that the retarded ignition timing has no adverse effect upon operating conditions of the engine.

The abnormal combustion-detecting means 20 determines whether or not postignition has actually occurred before the ignition timing retarded by the ignition timing-retarding means 10, i.e., before the retarded timing t2' at which the ignition signal is generated for the particular engine cylinder #3 in (b) of FIG. 2, and further determines whether or not there is a possibility of occurrence of preignition based upon the number of times of occurrence of postignition.

Specifically, an engine operating condition-determining circuit 101 determines whether or not the predetermined engine operating condition is satisfied based upon the output signals from the sensors 71–75. The predetermined engine operating condition may include the following conditions:

(1) the intake air temperature $T_A$ is higher than a predetermined value, e.g. 80° C.;
(2) the water vapor pressure of intake air is higher than a predetermined value, e.g., 12 mmHg, wherein the engine 1 can produce high output;
(3) the engine coolant temperature $T_W$ is higher than a predetermined value, e.g. 95° C.; and
(4) engine knocking (light engine knocking) of a magnitude is within a predetermined range, which does not damage the engine 1, is detected by the knocking sensor 73.

When the engine operating condition-determining circuit 101 determines that at least one of the above conditions (1) through (4) is satisfied based upon the output signals from the sensors 71–75, it supplies a corresponding signal to the particular ignition timing-retarding circuit 102, which in turn supplies the ignition timing control means 5 with an instruction signal for retarding the ignition timing for the particular cylinder #3 by the predetermined time period or angle which has no adverse effect upon the engine operation. On the other hand, the particular ignition timing-retarding circuit 102 also supplies the ionic current-detecting circuit 201 of the abnormal combustion-detecting means 20 with a signal indicating that the ignition timing for the particular cylinder #3 has been retarded, to enable detection of postignition precedent to preignition.

Responsive to the instruction signal from the particular ignition timing-retarding circuit 102, the ignition timing control means 5 supplies the ignition unit 4 with an ignition timing signal indicative of ignition timing retarded by the predetermined time period or angle solely for the particular cylinder #3. Based on the ignition timing signal, the ignition unit 4 generates an ignition signal at the retarded ignition timing [(b) of FIG. 2]and supplies it to the spark plug 2.

Now, let it be assumed that the postignition (hot surface ignition) has taken place within an engine cylinder with the predetermined engine operating condition satisfied. According to the invention, the ignition timing for the particular engine cylinder #3 is retarded by the predetermined time period or angle ((b) of FIG. 2) so that postignition will occur, as shown at (b) of FIG. 2, precedently to the retarded ignition timing (e.g., timing t2' at (b) of FIG. 2) for the spark plug 2. Therefore, ionic current is created by combustion caused by the postignition when the spark plug 2 is acting as the ionic current-detecting section of the combustion state-detecting circuit B, and accordingly it can be judged that the resulting ionic current and hence combustion is attributable to postignition occurring precedently to the retarded ignition by the spark plug 2.

The ionic current created by the spark plug 2 is supplied to the ionic current-detecting circuit 201 through the combustion state-detecting circuit B. While receiving the aforesaid signal from the particular ignition timing-retarding circuit 102, that is, while the predetermined engine operating condition is satisfied, the ionic current-detecting circuit 201 supplies a signal indicative of occurrence of postignition to the postignition-determining circuit 202 based upon the ionic current detected thereby. The postignition-determining circuit 202 counts the number of times the signal indicative of occurrence of postignition is supplied from the circuit 201 while the predetermined engine operating condition is satisfied. If the above signal has been supplied a predetermined number of times or more, the circuit 202 judges that there is a possibility of occurrence of preignition. If it is so judged, the postignition-determining circuit 202 supplies a signal indicative of the possibility of occurrence of preignition to the set ignition timing-retarding circuit 8 in order to lower the temperature within the engine cylinders. Responsive to the signal from the postignition-determining circuit 202, the set ignition timing-retarding circuit 8 supplies the ignition timing control means 5 with an instruction signal for retarding simultaneously the ignition timing signals for all the engine cylinders, which have been set in accordance with engine operating conditions, by a predetermined time period or a predetermined angle, in order to avoid occurrence of preignition. The retardation of the ignition timing signals is carried out over a predetermined time period, and thereafter the ignition timing is gradually or progressively brought back or advanced from the retarded ignition timing to the set normal timing suited for engine operating conditions. When postignition takes place again, the retardation of the ignition timing is carried out in the same manner as that described above. In this way, whenever postignition takes place, the ignition timing for all the cylinders is retarded by the predetermined time period or angle to thereby lower the temperature of combustion of the mixture within the cylinders and hence lower the temperature of the inner walls of the engine cylinders, the spark plugs, etc., thus positively preventing occurrence of preignition which should otherwise be caused by the postignition.

Figure 3:
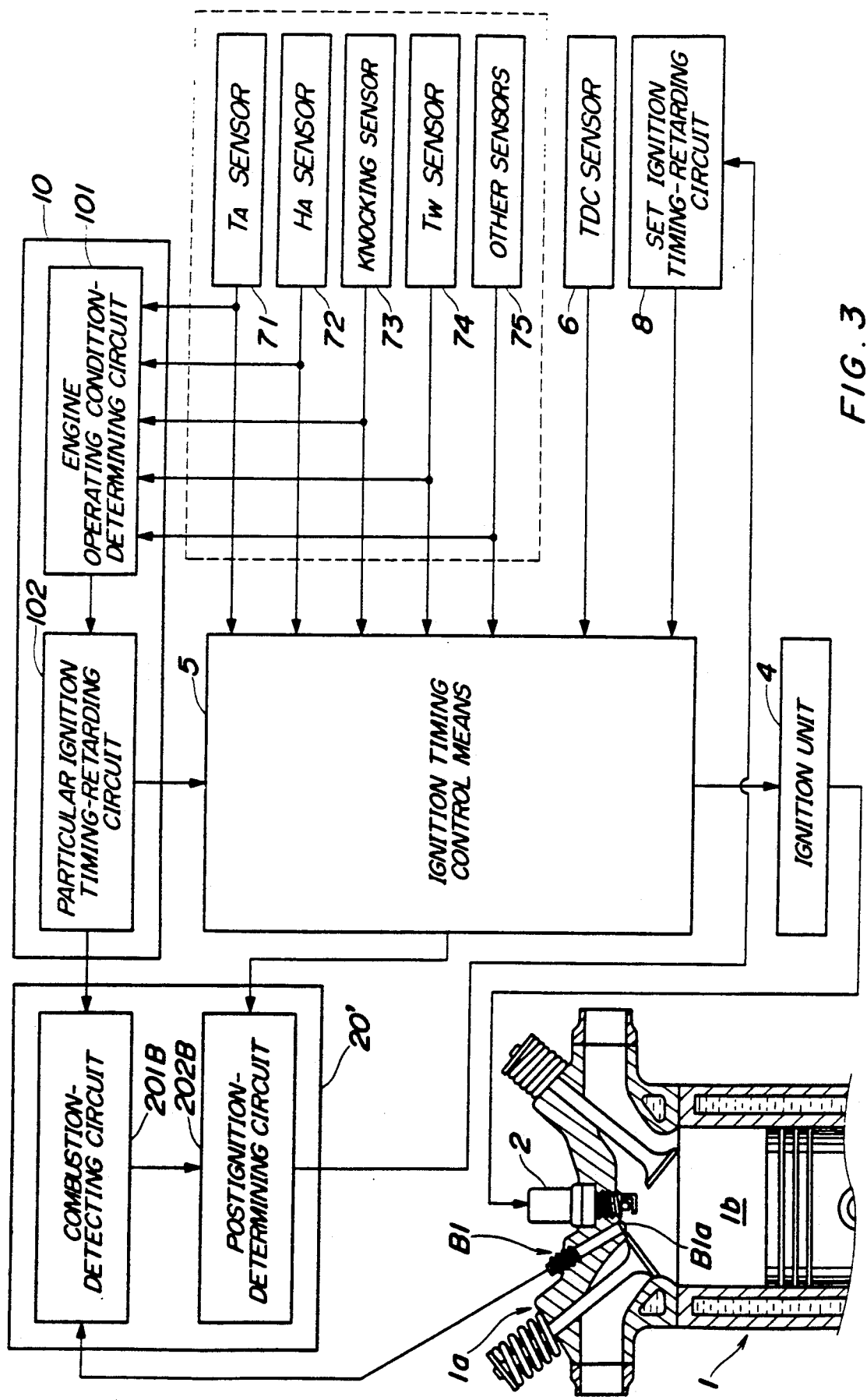
FIG. 3 is a block diagram similar to FIG. 1, according to a second embodiment of the invention.

FIG. 3 shows a second embodiment of the invention. The second embodiment is distinguished from the first embodiment in that a burning light-detecting device (optical fiber scope) B1 and a combustion-detecting circuit 201B are employed in place of the combustion state-detecting circuit B (spark plug 2, high voltage diode 3, and ionic current-detecting circuit 201), which form a combustion state-detecting means.

Specifically, the optical fiber scope B1 is inserted through a cylinder head 1a of a particular cylinder with a tip B1a thereof exposed to the combustion chamber 1b and is oriented toward a location within the combustion chamber 1b where abnormal combustion can take place, i.e., a location close to the tip of the spark plug 2 where a nucleus of combustion can be formed. The optical fiber scope B1 optically detects flame of combustion taking place within the combustion chamber 1b and supplies a signal indicative of the detected occurrence of flame to the combustion-detecting circuit 201B. The combustion-detecting circuit 201B cooperates with the postignition-determining circuit 202B to form abnormal combustion-detecting means 20'. The combustion-detecting circuit 201B supplies the postignition-determining circuit 202B with a signal indicative of occurrence of flame sensed by the optical fiber scope B1 only while it is supplied with a signal indicating that the ignition timing for a particular cylinder (cylinder #3) is retarded by a predetermined angle, i.e., only while the predetermined engine operating condition is satisfied where postignition is apt to take place. The postignition-determining circuit 202B recognizes timing at which normal flame should be developed by spark ignition based upon the ignition timing signal from the ignition timing control means 5, and determines whether or not the actual timing of development of the flame sensed by the optical fiber scope B1 is earlier than the timing of development of flame by normal spark ignition. If it is determined that the former is earlier than the latter, the postignition-determining circuit 202B judges that the sensed flame has been caused by postignition, and accordingly supplies a signal indicative of the possibility of occurrence of preignition to the set ignition timing-retarding circuit 8.

Incidentally, in the second embodiment, the other elements and parts not referred to above are substantially identical in construction and function to those of the first embodiment, and description and illustration thereof are therefore omitted.

Figure 4:
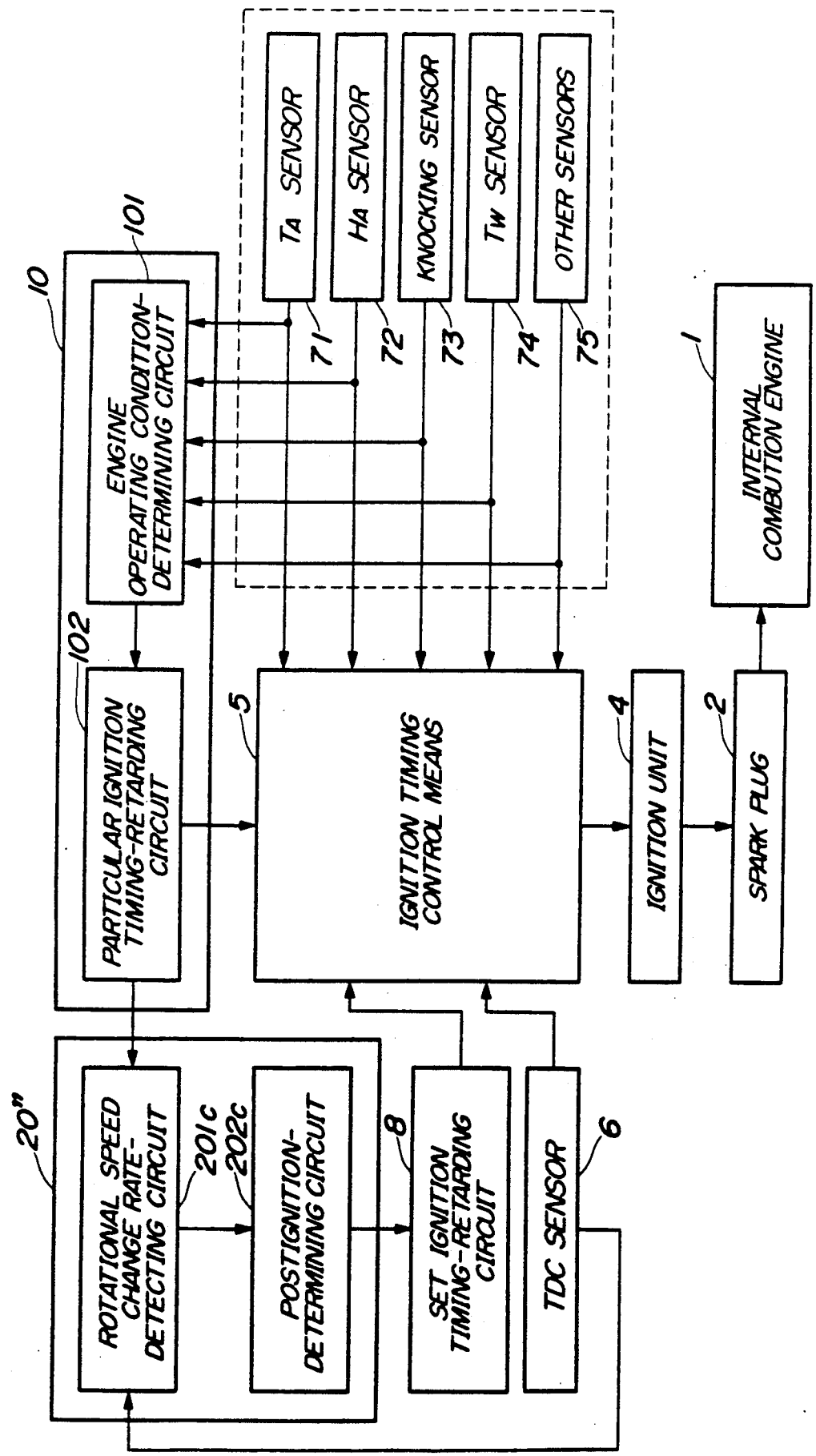
FIG. 4 is a block diagram similar to FIG. 1, according to a third embodiment of the invention.

FIG. 4 shows a third embodiment of the invention. The third embodiment is distinguished from the first and second embodiments in that a rotational speed change rate-detecting circuit 201c is used in place of the high voltage diode 3 and the ionic current-detecting circuit 201 of the first embodiment or the optical-fiber scope B1 and the combustion detecting circuit 201B of the second embodiment. The rotational speed change rate-detecting circuit 201c detects the rate of change in the engine rotational speed based upon TDC signal pulses from the TDC sensor 6, and presumes abnormal combustion occurring within the combustion chamber from the detected rate of change.

As stated before, when it is determined that the predetermined engine operating condition is satisfied, based upon the engine parameter signals from the sensors 71-75, the ignition timing for the particular engine cylinder is retarded by the predetermined time period or angle by the particular ignition timing-retarding circuit 102.

Retarding of the ignition timing by the predetermined time period or angle leads to decrease in the output torque and hence decrease in the engine rotational speed Ne. However, when postignition takes place within the cylinder for which the ignition timing has been retarded, flame of postignition is developed within the cylinder earlier than the retarded ignition timing so that the decrease in the engine rotational speed Ne becomes small. The third embodiment is based upon the above fact.

The rotational speed change rate-detecting circuit 201c cooperates with the postignition- determining circuit 202c to form abnormal combustion-detecting means 20". The rotational speed change rate-detecting circuit 201c supplies the postignition-determining circuit 202c with a signal indicative of the rate of change ΔNe in the engine rotational speed Ne, only while it is receiving the signal indicating that the ignition timing for the particular engine cylinder has been retarded, from the particular ignition timing-retarding circuit 102. The postignition-determining circuit 202c determines whether or not the rotational speed change rate is within a predetermined range. If it is determined that it is within the predetermined range, it is judged by the postignition-determining circuit 202c that abnormal combustion has occurred within the engine cylinder, and accordingly the postignition-determining circuit 202c supplies the set ignition timing-retarding circuit 8 with a signal indicative of occurrence of preignition to lower temperature within the cylinder.

Incidentally, in the third embodiment, the other elements and parts not referred to above are substantially identical in construction and function to those of the first embodiment, and description and illustration thereof are therefore omitted.

Although in the third embodiment described above, the occurrence of abnormal combustion is presumed from the engine rotational speed change rate without directly sensing the abnormal combustion, it may alternatively be presumed in the following manners:

As a first manner, a torque sensor, e.g., a sensor for detecting a strain in the engine crankshaft by means of moire fringes, is provided on the engine crankshaft for detecting a change rate in the torque of the crankshaft, to determine from the detected changed rate in torque whether or not the engine output has varied due to the retardation of the ignition timing during the predetermined engine operating condition. That is, if the variation in the crankshaft torque is small even with the retardation of the ignition timing, it can be assumed that abnormal combustion has occurred by postignition.

As a second manner, a cylinder pressure sensor is provided within an engine cylinder to detect abnormal combustion within the cylinder from the output of the sensor. The cylinder pressure sensor detects a change rate in pressure within the combustion chamber of the cylinder by means of a piezoelectric element provided at a washer of the spark plug, for example. If a certain degree of variation or more in the cylinder pressure due to combustion is detected by the cylinder pressure sensor prior to the retarded ignition timing even with the retardation in the ignition timing when the predetermined engine operating condition is satisfied, it can be assumed that postignition has occurred.

Also by the use of a torque sensor or a cylinder pressure sensor as described above as the combustion-detecting device, similar results to those described above may be obtained.

To prevent preignition, the invention is not limited to ignition timing-retarding means as described above, but other various means may be employed. For example, fuel supply control means may be employed to cool the cylinder inner wall, etc. by heat of vaporization with an excessive amount of fuel supplied thereby.

Although in the above described embodiments, the ignition timing is retarded for a single particular engine cylinder (cylinder #3) for the detection of abnormal combustion (postignition), alternatively, the retarding may be made for two or more engine cylinders.

What is claimed is:

1. An abnormal combustion-detecting device for an internal combustion engine having cylinders, which detects abnormal combustion of an air-fuel mixture supplied to said cylinders to inhibit preignition of the mixture, comprising:
   ignition timing-setting means for setting ignition timing for said cylinders in accordance with operating conditions in which said engine is operating;
   ignition timing-retarding means for retarding the set ignition timing for at least one of said cylinders when said engine is in a predetermined operating condition; and
   abnormal combustion-detecting means operable only when said ignition timing-retarding means has retarded the set ignition timing, for detecting abnormal combustion within said at least one cylinder.

2. An abnormal combustion-detecting device as claimed in claim 1, wherein said ignition timing-retarding means retards the set ignition timing to a timing later than timing of possible occurrence of postignition.

3. A combustion control device for an internal combustion engine having cylinders, which controls combustion of an air-fuel mixture supplied to said cylinders, comprising:
   ignition timing-setting means for setting ignition timing for said cylinders in accordance with operating conditions in which said engine is operating;
   ignition timing-retarding means for retarding the set ignition timing for at least one of said cylinders when said engine is in a predetermined operating condition;
   abnormal combustion-detecting means for detecting abnormal combustion within said at least one cylinder when said ignition timing-retarding means retards the set ignition timing; and
   cylinder temperature-lowering means for lowering temperature within said cylinders when said abnormal combustion-detecting means detects abnormal combustion within said at least one cylinder.

4. A combustion control device as claimed in claim 3, wherein said predetermined operating condition is a condition that a temperature of said engine is higher than a predetermined high temperature value.

5. A combustion control device as claimed in claim 4, wherein the temperature of said engine is the temperature of intake air being supplied to said engine.

6. A combustion control device as claimed in claim 4, wherein the temperature of said engine is the temperature of engine coolant.

7. A combustion control device as claimed in claim 3, wherein said predetermined operating condition is a condition that a temperature of said engine is within a predetermined range within which said engine can produce high output.

8. A combustion control device as claimed in claim 7, wherein the temperature of said engine is the temperature of intake air being supplied to said engine.

9. A combustion control device as claimed in claim 3, wherein said predetermined operating condition is a condition that engine knocking of a magnitude within a predetermined range occurs in said engine.

10. A combustion control device as claimed in claim 3, wherein said ignition timing-retarding means retards the ignition timing solely for a particular one of said cylinders.

11. A combustion control device as claimed in claim 10, wherein said cylinder temperature-lowering means retards simultaneously the ignition timing for all said cylinders.

12. A combustion control device as claimed in any of claims 3 to 11, wherein said cylinder temperature-lowering means retards the ignition timing for said cylinders by a predetermined time period.

13. A combustion control device as claimed in any of claims 3 to 11, wherein said cylinder temperature-lowering means retards the ignition timing for said cylinders by a predetermined angle.

14. A combustion control device as claimed in any of claims 3 to 11, wherein said cylinder temperature-lowering means carries out the retardation of the ignition timing over a predetermined time period, and thereafter progressively advances the ignition timing from the retarded ignition timing to the set ignition timing.

15. A combustion control device as claimed in any of claims 3 to 11, wherein said abnormal combustion-detecting means comprises means for detecting ionic current created by combustion within said at least one cylinder, and detecting abnormal combustion based upon the detected ionic current.

16. A combustion control device as claimed in claim 15, wherein said abnormal combustion-detecting means judges that abnormal combustion occurs within said at least one cylinder when the ionic current has occurred a predetermined number of times or more during said predetermined operating condition of said engine.

17. A combustion control device as claimed in any of claims 3 to 11, wherein said abnormal combustion-detecting means comprises means for optically sensing flame caused by combustion within said at least one cylinder, and detecting abnormal combustion within said at least one cylinder based upon the sensed flame.

18. A combustion control device as claimed in any of claims 3 to 11, wherein said abnormal combustion-detecting means comprises means for detecting a change rate in the rotational speed of said engine, and detecting abnormal combustion within said at least one cylinder based upon the detected change rate in the rotational speed of said engine.

19. A combustion control device as claimed in any of claims 3 to 11, wherein said abnormal combustion-detecting means comprises means for detecting a change rate in torque from said engine, and detecting abnormal combustion within said at least one cylinder based upon the detected change rate in the torque.

20. A combustion control device as claimed in any of claims 3 to 11, wherein said abnormal combustion-detecting means comprises means for detecting a change rate in pressure within said at least one cylinder, and detecting abnormal combustion detected change rate in the pressure.

* * * * *